United States Patent
Wang et al.

(10) Patent No.: US 11,093,403 B2
(45) Date of Patent: Aug. 17, 2021

(54) SYSTEM AND METHODS OF A SELF-TUNING CACHE SIZING SYSTEM IN A CACHE PARTITIONING SYSTEM

(71) Applicant: VMware, Inc., Palo Alto, CA (US)

(72) Inventors: Wenguang Wang, Santa Clara, CA (US); Abhishek Srivastava, Palo Alto, CA (US); Ashish Kaila, Cupertino, CA (US); Julien Freche, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 65 days.

(21) Appl. No.: 16/209,119

(22) Filed: Dec. 4, 2018

(65) Prior Publication Data
US 2020/0174936 A1    Jun. 4, 2020

(51) Int. Cl.
*G06F 12/0871*    (2016.01)

(52) U.S. Cl.
CPC .. *G06F 12/0871* (2013.01); *G06F 2212/1021* (2013.01); *G06F 2212/16* (2013.01); *G06F 2212/6042* (2013.01)

(58) Field of Classification Search
CPC ............ G06F 12/0871; G06F 12/0806; G06F 2212/1021; G06F 2212/6042; G06F 2212/604; G06F 2212/282
See application file for complete search history.

(56) References Cited

U.S. PATENT DOCUMENTS

| | | | |
|---|---|---|---|
| 5,357,623 A | 10/1994 | Megory-Cohen | |
| 6,493,800 B1 | 12/2002 | Blumrich | |
| 6,862,606 B1 | 3/2005 | Major et al. | |
| 6,865,647 B2 | 3/2005 | Olarig et al. | |
| 6,871,264 B2 | 3/2005 | Soltis, Jr. | |
| 8,094,500 B2 | 1/2012 | Paley et al. | |
| 9,092,318 B2 | 7/2015 | Ahmad et al. | |
| 9,128,855 B1 | 9/2015 | Natanzon et al. | |
| 9,361,218 B2 | 6/2016 | Almad et al. | |
| 2004/0019891 A1 | 1/2004 | Koenen | |
| 2004/0107318 A1 | 6/2004 | Bono et al. | |
| 2004/0168037 A1 | 8/2004 | Dearth et al. | |
| 2005/0246452 A1 | 11/2005 | Spencer et al. | |
| 2005/0273568 A1 | 12/2005 | Blandy | |
| 2006/0026372 A1 | 2/2006 | Kim et al. | |

(Continued)

OTHER PUBLICATIONS

Kim, S., Chandra, D. and Y. Solihin, "Fair Cache Sharing and Partitioning in a Chip Multiprocessor Architecture," Proceedings of the 13th International Conference on Parallel Architecture and Compilation Techniques (PACT'04), 2004.*

(Continued)

*Primary Examiner* — Tracy A Warren
(74) *Attorney, Agent, or Firm* — Patterson + Sheridan, LLP

(57) ABSTRACT

The disclosure provides a technique for reducing cache misses to a cache of a computer system. The technique includes deallocating memory pages of the cache from one process and allocating those memory pages to another process based on cache misses of each process during a given time period. Repeating the technique leads the total number of cache misses to the cache to gradually decrease to an optimum or near optimum level. The repetition of the technique leads to a dynamic and flexible apportionment of cache memory pages to processes running within the computer system.

20 Claims, 2 Drawing Sheets

(56) References Cited

U.S. PATENT DOCUMENTS

| | | |
|---|---|---|
| 2006/0277389 A1 | 12/2006 | Hepkin et al. |
| 2007/0204117 A1 | 8/2007 | Van Riel et al. |
| 2008/0077764 A1 | 3/2008 | Pierce et al. |
| 2008/0235499 A1 | 9/2008 | Togawa |
| 2009/0164715 A1 | 6/2009 | Astigarraga et al. |
| 2009/0214028 A1 | 8/2009 | Schneider |
| 2009/0307462 A1 | 12/2009 | Fleming et al. |
| 2010/0235542 A1 | 9/2010 | Visharam et al. |
| 2011/0231826 A1 | 9/2011 | Narasimhan |
| 2013/0205113 A1* | 8/2013 | Ahmad ............... G06F 12/023 711/170 |
| 2018/0052630 A1* | 2/2018 | Peng ................ G06F 12/0802 |

OTHER PUBLICATIONS

C. Watson, "Ratios: Definition & Examples," 2018, available at https://sciencing.com-definition-examples-13712461.html.*

Sparsh Mittal. 2017. A survey of techniques for cache partitioning in multicore processors. ACM Comput. Surv. 50, 2, Article 27 (May 2017), 39 pages.*

D. Magenheimer, Transcendent Memory for Linux. 2009.

IBM Memory Management: VMRM-CMM and CMMA; as published on the internet Aug. 2008 at http://www.vm.ibm.com/perf/reports/zvm/html/530cmm.html.

IBM Optimizing AIX 5L performance: Tuning your memory settings, Part 1; May 2007; http://www.ibm.com/developerworks/aix/library/au-aixoptimization-memtun1/.

Microsoft Remote Differential Compression; at published on the internet Nov. 2010; http://msdn.microsoft.com/enus/library/aa372948(VS.85).aspx.

* cited by examiner

SYSTEM AND METHODS OF A SELF-TUNING CACHE SIZING SYSTEM IN A CACHE PARTITIONING SYSTEM

BACKGROUND

A computing device usually has multiple processes running on it. The processes tend to have different memory usages, depending on for example, the number of input/output (I/Os) issued by a process, and the type of data working set that is being accessed by the process. It is useful to be able to adjust the amount of memory allocated to a process. One method for a system to allocate more memory to a process, such as from another process, is described within U.S. Pat. No. 9,092,318, entitled "Method of Allocating Referenced Memory Pages from a Free List," issued Jul. 28, 2015, the entire contents of which are incorporated by reference herein. However, being able to dynamically allocate memory between processes does not solve the problem of how to optimize the proportions of total available memory between processes.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides a method for reducing cache misses to a cache of a computer system. The approach includes deallocating memory pages of the cache from one process and allocating those memory pages to another process based on cache misses of each process during a given time period. Repeating this method leads to the total number of cache misses to the cache to gradually decreasing to an optimum or near optimum level. Repeating this method also leads to a dynamic and flexible apportionment of memory pages within the cache, to processes running within the computer system, improving the functioning of the computer itself by speeding up execution of applications running within the computer system.

Figure 1:
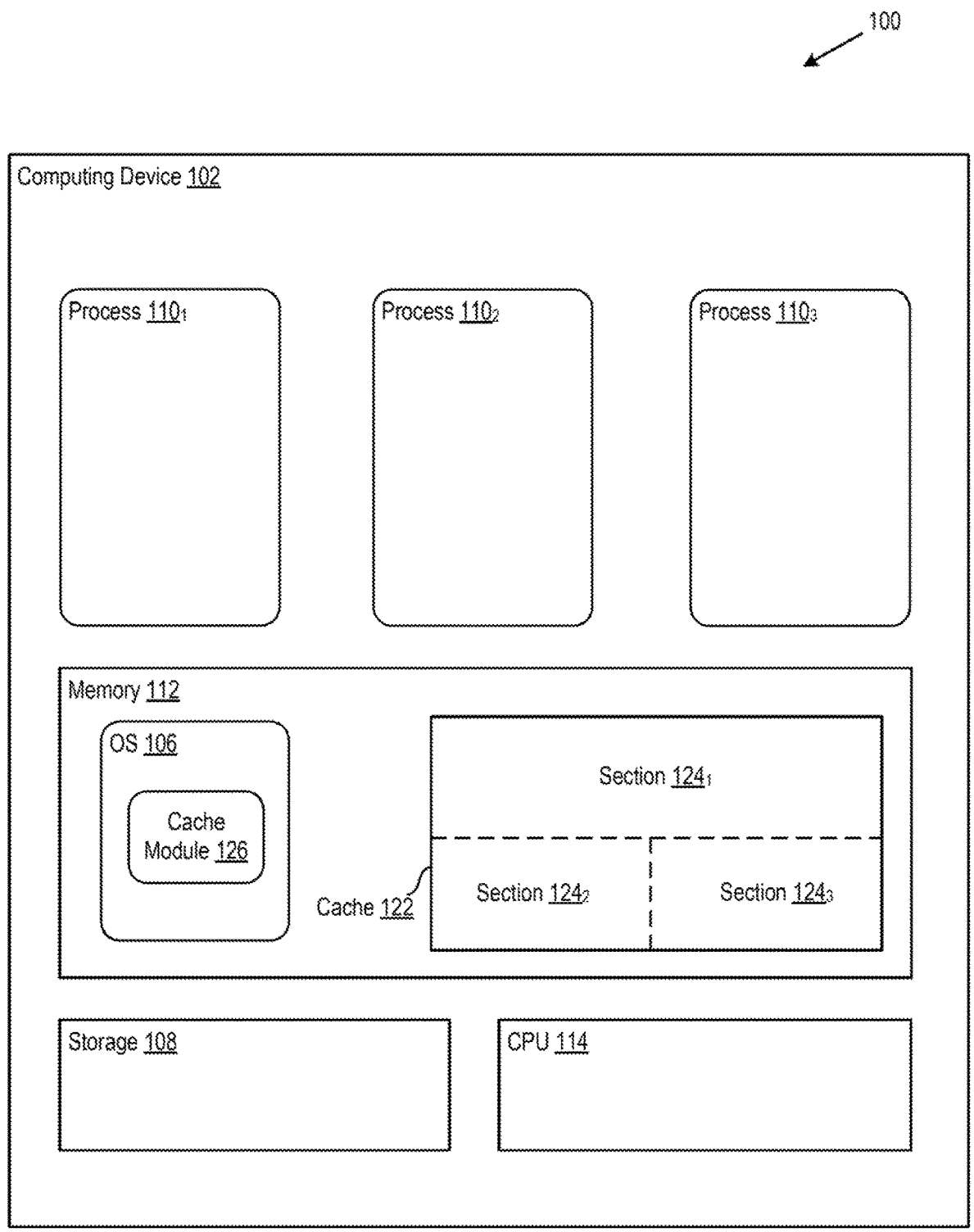
FIG. 1 depicts a block diagram of a computer system in which one or more embodiments of the present invention may be implemented.

FIG. 1 depicts a block diagram of a computer system 100 in which one or more embodiments of the present invention may be implemented. Computer system 100 includes at least one computing device 102.

Computing device 102 includes a memory 112, one or more processors (CPUs) 114, a storage 108, and one or more processes 110 executing within computing device 102.

Storage 108 represents persistent storage devices (e.g., one or more hard disks, flash memory modules, solid state disks, NVMe disks, and/or optical disks). Storage 108 may be internal to computing device 102, or may be external to computing device 102 and coupled via a host bus adapter (HBA) or network interface card (NIC) of computing device 102, such as over a network.

Memory 112 is hardware allowing information, such as executable instructions, configurations, and other data, to be stored and retrieved. Memory 110 is where programs and data are kept when CPU 108 is actively using them. Memory 110 may be volatile memory or non-volatile memory.

Memory 112 includes an operating system (OS) 106. The OS running within memory 112 of computing device 102 may be a conventional desktop OS, like Microsoft Windows, Mac OS, or Linux. In other embodiments, the OS may be a native, or "bare metal," virtualization hypervisor, like VMware's ESX Hypervisor, Linux KVM hypervisor, Hyper-V hypervisor, or Zen hypervisor.

OS 106 includes a cache module 126. Cache module 126 is a software service that manages cache 122. Cache module 126 may be a privileged component of OS 106, running within the kernel of OS 106 with kernel-level privileges. Cache module 126 may be a component of a kernel-level input/output (I/O) stack that is configured to perform I/O with respect to a storage 108. In an embodiment, cache module 126 may be a component of computing device 102 that is external to OS 106.

Memory 112 includes a cache 122. Cache 122 is divided into sections 124. Each section 124 is a portion of cache 122 allocated to a process 110 to support the execution of that process 110. For example, section $124_1$ may represent a set of memory pages allocated by cache module 126 to process $110_1$. Section $124_1$ may represent a set of memory pages allocated by cache module 126 to process $110_1$. Section $124_1$ may represent a set of memory pages allocated by cache module 126 to process $110_1$. The size of sections 124 may be dynamically adjusted, for example, by some memory pages of section $124_1$ being reallocated from section $124_1$ to section $124_2$, to reduce the total number of cache misses within computer system 100, as further discussed below with reference to FIG. 2, below. In an embodiment, cache 122 has a total size that is fixed and cannot be dynamically adjusted while one or more processes 110 execute within computing device 102 or computer system 100.

Each process 110 is an instance of a computer program executing on computing device 102. Process 110 may be a user-level process or a privileged process of the OS kernel. A "user-level" process, as used herein, is a process that is not running with kernel-level privileges while executing on CPU 114 and/or that is running outside of the kernel of OS 106. Processes 110 execute on the one or more processors 114. Examples of processes 110 include application programs, shared libraries, virtual machines (VMs), etc. In an embodiment, processes 110 connect to hardware of computer system 100 through single root input/output virtualization (SR-IOV) technology. Although three user processes $110_1$, $110_2$, and $110_3$ are shown, any number of user processes may run concurrently on computing device 102 or computer system 100.

Each process 110 may have its own virtual address space. As known in the art, virtual memory is an abstraction of physical memory that gives a process 110 the illusion of having large or infinite memory available. Virtual memory addresses are mapped to physical memory addresses by page tables stored in memory 112. Specifically, virtual addresses of processes 110 are mapped to memory pages within the process's designated section 124 of cache 122.

Each process 110 sends I/O operations, such as read or write operations, to OS 106. The I/O operations are directed to data locations on storage 108. Cache module 126 of OS 106 handles the I/O operations by first checking whether the data requested by the I/O operation is within cache 122. If that data is not within cache 122, then the I/O operation results in is a "cache miss." If the data is within cache 122, then the I/O operation results in a "cache hit." For a cache miss, cache module 126 loads the data from storage 108 into a memory page of section 124 associated with the process 110 that issued the I/O. If cache 122 is full, the cache module 126 first evicts data from cache 122, and then adds the data for the I/O into a memory page of cache 122.

Accessing data from storage 108 and then providing that data to the requesting process 110 is slower than providing the requested data from cache 122. That is, performing an I/O operation that results in a cache hit is faster than performing an I/O operation that results in a cache miss. Cache 122 allows process 110 to execute its instructions faster than if that process 110 had to retrieve data from storage 108.

In order for cache 122 to be effective at speeding up execution of process 110, process 110 should have a high cache hit ratio, or "hit ratio," when accessing cache 122. The hit ratio of a process over a period of time is the number of cache hits during the period of time, divided by the total number of I/O operations during that same period of time:

$$\text{Hit Ratio} = \frac{\text{cache hits}}{\text{total } I/Os}$$

In order for cache 122 to be effective, process 110 also should have a low cache miss ratio, or "miss ratio." The miss ratio of a process over a period of time is one minus hit ratio:

Miss Ratio=1−Hit Ratio

The miss ratio of a process can also be calculated by dividing the number of cache misses during a period of time by the total number of I/O operations during that period of time:

$$\text{Miss Ratio} = \frac{\text{cache misses}}{\text{total } I/Os}$$

For example, if miss ratio is 1/10 or 10%, then if one-hundred I/O operations are sent to cache 122, ten of those operations have to go to storage 108 to retrieve data. As described, an I/O operation that retrieves data from storage 108 is slower than an I/O operation that retrieves data from cache, without needing to access storage 108. Because of this, the speed of an application (e.g., process 110) can often be determined by the miss ratio of that application. One way to reduce the miss ratio is by increasing the size of cache 122 available to that application. However, it is not always clear whether it is "fair" or optimal to take a portion of cache 122 from one process 110 and allocate that portion to another process 110.

Different approaches are possible for determining how cache 122 is to be divided among processes 110. One approach is to lower to an optimum or near optimum level the total number of cache misses within computing device 102 or computer system 100. It should be noted that by way of reducing cache misses to an optimum or near optimum level, cache hits are increased to an optimum or near optimum level, because the number of cache hits in a given time period equals the total number of I/O operations in that time period minus the number of cache misses in that time period.

One approach to optimize cache hits and misses within computing device 102 or computer system 100 is described with reference to FIG. 2.

Figure 2:
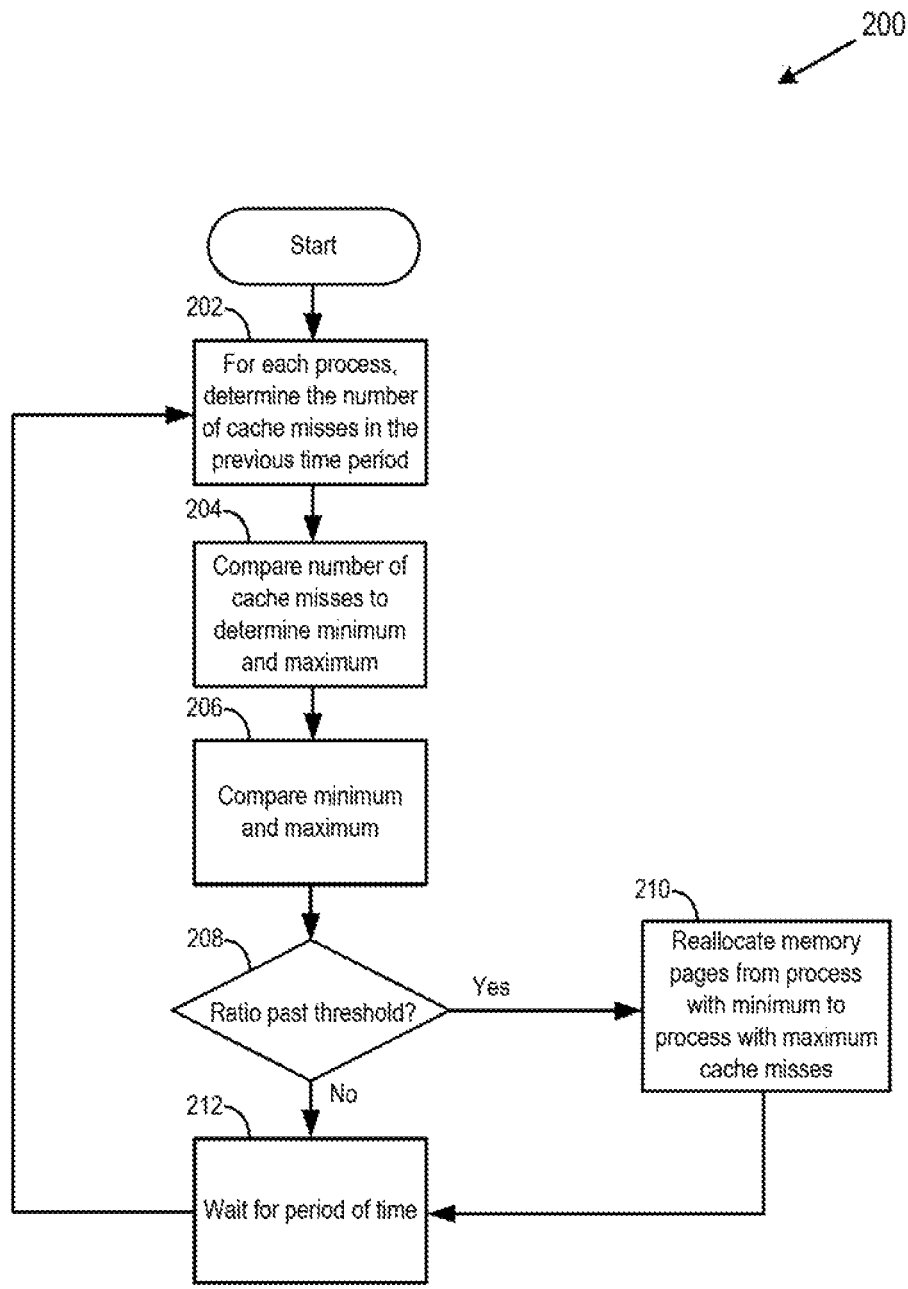
FIG. 2 is a block diagram of a method of allocating memory pages of a cache among process so as to reduce the total number of cache misses, according to an embodiment.

FIG. 2 is a block diagram of a method 200 of allocating memory pages of cache 122 among process 110 so as to reduce to an optimum or near optimum level the total number of cache misses within computing device 102, according to an embodiment. In an embodiment, method 200 may be performed by cache module 126, for some or all processes 110 executing within computing device 102. In a second embodiment in which more than one computing device 102 is present within computer system 100, method 200 may optionally be performed for some or all processes 110 within computer system 100, on some or all computing devices 102. For the second embodiment, the processes 110 that are distributed among multiple computing devices 102 share a cache, such as cache 122, that may be located within one of the computing devices 102 or externally to computing devices 102. In an embodiment, method 200 is performed only if cache 122 is full. If cache 122 is not full, then rather than reallocating memory pages from one process to another, available memory pages can be assigned to a process without unassigning memory pages from another process.

At block 202, cache module 126 determines, for each process 110 within computing device 102, the number of cache misses that occurred for that process 110 within a given previous time period. The time period may be, for example, one-tenth of a second, one-half of a second, one second, or two seconds. For example, at block 202, cache module 126 may determine the number of cache misses that occurred for process $110_1$ in the last half second, the number of cache misses that occurred for process $110_2$ in the last half second, and the number of cache misses that occurred for process $110_3$ in the last half second. Cache module 126 may determine the number of cache misses by directly observing and counting cache misses, or cache module 126 may determine the number of cache misses by calculation, such as by using one of the formulas above.

At block 204, cache module 126 analyzes the cache miss number of each process 110 to determine which process 110 had the largest (maximum or most) number of cache misses and which process 110 had the smallest (minimum or least) number of cache misses during the time period.

At block 206, cache module 126 compares the maximum cache miss number to the minimum cache miss number. The comparison may be by, for example, calculating a ratio of the maximum to minimum or vice versa. The comparison may also be done by, for example, subtracting the minimum from the maximum.

At block 208, cache module 126 determines whether the difference between the maximum cache misses and minimum cache misses has reached a threshold. As used herein, the term "difference" is used generally to indicate a numerical distance between two numbers can be obtained, for example, by calculating a ratio maximum cache misses and minimum cache misses or by subtracting minimum cache misses from maximum cache misses. For example, if the maximum number of cache misses determined at block 202 was 1000 and the minimum was 100, then the ratio of maximum to minimum is 10. The threshold may be, for example, 1.1, 1.3, 1.5, 2.0, or 3.0. In this example, if the ratio is 10 while the threshold is 3, then the threshold has been reached (i.e., ratio is above threshold).

The ratio may also be calculated by dividing the minimum by the maximum, in which case the result would be less than one, and the determination at block 208 would be whether the ratio is less than a threshold. In an embodiment, rather than calculating a ratio, cache module 126 may instead subtract the minimum number of cache misses from the maximum and compare the difference to a threshold. If at block 208 cache module 126 determines that the difference is past the threshold (e.g., if ratio of maximum to minimum is more than the threshold), then method 200 continues to block 210. Otherwise, method 200 continues to block 212.

At block 210, cache module 126 reallocates (moves or assigns) some small number of memory pages from (a) process 110 that had the least number of cache misses within the time period, to (b) process 110 that had the most number of cache misses within the time period. For example, a certain number of memory pages from section $124_1$ might be removed from section $124_1$ and deallocated from process $110_1$, and instead, those memory pages might be allocated to process $124_2$ and added to section $124_2$.

In an embodiment, the number of memory pages allocated from one process to another may be determined with reference to the size of cache 122, or the size of section 124 of the process with maximum and/or the size of section 124 of the process with minimum cache hits. For example, the number of memory pages moved from a first process to a second process may be a percentage of memory pages of the first process, such as 1%, 2%, or 5%. In another embodiment, the number of memory pages allocated from one process to another may be in terms of static size metrics, such as for example, 1 MB, 2 MB, 5 MB, 10, MB, or 20 MB. Memory pages may be reallocated from one process to another using techniques known in the art, such as for example, the "Yankable Memory" techniques taught in U.S. Pat. No. 9,092,318, incorporated by reference above.

At block 212, cache module 126 waits for a certain amount of time before returning to block 202. The certain period of time of block 212 may be the same amount of time as the period of time for which the number of cache misses was calculated in block 202. Waiting for a certain period of time at block 212 repeats method 200 every period of time for which cache miss numbers are calculated at block 202. The frequent repetition of method 200 leads the total number of cache misses to cache 122 within computing device 102 to gradually decrease to an optimum number, and that optimum number can reach a steady equilibrium if conditions within computing device 102 remain steady. The repetition of method 200 leads to a dynamic and flexible apportionment of memory pages of sections 124 within cache 122 to processes 110, improving the functioning of the computer itself by speeding up execution of applications running on computing device 102.

It should be understood that, for any method described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, phase change memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of reducing cache misses to a cache of a computer system, the computer system comprising a plurality of processes performed by one or more processors, wherein each process of the plurality of processes has a portion of memory pages of the cache allocated to that process, the method comprising:
   for each process of the plurality of processes, determining a number of cache misses during a first time period, wherein the first time period is a first length of time in duration;
   determining, based on the number of cache misses for each process, that a first process has a maximum number of cache misses and a second process has a minimum number of cache misses;
   determining whether a difference between the maximum number of cache misses and the minimum number of cache misses has reached a threshold; and
   when the difference has reached the threshold, reallocating at least one memory page of the cache from the second process to the first process.

2. The method of claim 1, further comprising:
   subsequent to reallocating the at least one memory page, waiting for a second time period; and
   subsequent to the waiting, for each process of the plurality of processes, determining the number of cache misses that occurred during a third time period.

3. The method of claim 2, wherein the third and second time periods are also the first length of time in duration.

4. The method of claim 1, wherein the plurality of processes are user-level processes.

5. The method of claim 1, wherein the cache is full.

6. The method of claim 1, wherein the difference is a ratio of the maximum number of cache misses and the minimum number of cache misses.

7. The method of claim 6, wherein the ratio is obtained by dividing the maximum number of cache misses by the minimum number of cache misses, and wherein the ratio ranges from 1.1 to 3.

8. The method of claim 1, wherein the first length of time ranges between one-tenth of a second and one second.

9. A non-transitory computer readable medium comprising instructions to be executed by at least one processor of a computer system, the instructions when executed by the at least one processor cause the computer system to carry out a method of reducing cache misses to a cache of the computer system, the computer system comprising a plurality of processes performed by the at least one processor, wherein each process of the plurality of processes has a portion of memory pages of the cache allocated to that process, the method comprising:
   for each process of the plurality of processes, determining a number of cache misses during a first time period, wherein the first time period is a first length of time in duration;
   determining, based on the number of cache misses for each process, that a first process has a maximum number of cache misses and a second process has a minimum number of cache misses;
   determining whether a difference between the maximum number of cache misses and the minimum number of cache misses has reached a threshold; and
   when the difference has reached the threshold, reallocating at least one memory page of the cache from the second process to the first process.

10. The non-transitory computer readable medium of claim 9, the method further comprising:
   at least one memory page, waiting for a second time period; and
   subsequent to the waiting, for each process of the plurality of processes, determining the number of cache misses that occurred during a third time period.

11. The non-transitory computer readable medium of claim 10, wherein the third and second time periods are also the first length of time in duration.

12. The non-transitory computer readable medium of claim 9, wherein the plurality of processes are user-level processes.

13. The non-transitory computer readable medium of claim 9, wherein the cache is full.

14. The non-transitory computer readable medium of claim 9, wherein the difference is a ratio of the maximum number of cache misses and the minimum number of cache misses.

15. The non-transitory computer readable medium of claim 14, wherein the ratio is obtained by dividing the maximum number of cache misses by the minimum number of cache misses, and wherein the ratio ranges from 1.1 to 3.

16. The non-transitory computer readable medium of claim 9, wherein the first length of time ranges between one-tenth of a second and one second.

17. A computer system comprising:
a memory comprising a cache, the cache comprising memory pages;
a plurality of processes executing within the computer system; and
at least one processor programmed to carry out a method of reducing cache misses to the cache of the computer system, wherein each process of the plurality of processes has a portion of the memory pages of the cache allocated to that process, the method comprising:
- for each process of the plurality of processes, determining a number of cache misses during a first time period, wherein the first time period is a first length of time in duration;
- determining, based on the number of cache misses for each process, that a first process has a maximum number of cache misses and a second process has a minimum number of cache misses;
- determining whether a difference between the maximum number of cache misses and the minimum number of cache misses has reached a threshold; and
- when the difference has reached the threshold, reallocating at least one memory page of the cache from the second process to the first process.

18. The computer system of claim 17, the method further comprising:
- subsequent to reallocating the at least one memory page, waiting for a second time period; and
- subsequent to the waiting, for each process of the plurality of processes, determining the number of cache misses that occurred during a third time period.

19. The computer system of claim 18, wherein the third and second time periods are also the first length of time in duration.

20. The computer system of claim 17, wherein the plurality of processes are user-level processes.

* * * * *